(12) United States Patent
Bindon (10) Patent No.: US 11,583,130 B2
(45) Date of Patent: Feb. 21, 2023

(54) BEVERAGE BREWING ASSEMBLY

(71) Applicant: Timothy Arthur Bindon, Holland, MI (US)

(72) Inventor: Timothy Arthur Bindon, Holland, MI (US)

(*) Notice: Subject to any disclaimer, the term of this patent is extended or adjusted under 35 U.S.C. 154(b) by 702 days.

(21) Appl. No.: 16/657,455

(22) Filed: Oct. 18, 2019

(65) Prior Publication Data

US 2021/0113010 A1 Apr. 22, 2021

(51) Int. Cl.
*A47J 31/02* (2006.01)
*A47J 31/06* (2006.01)

(52) U.S. Cl.
CPC .......... *A47J 31/02* (2013.01); *A47J 31/0626* (2013.01); *A47J 31/0631* (2013.01)

(58) Field of Classification Search
CPC ................................. A47J 31/02; A47J 31/06
See application file for complete search history.

(56) References Cited

U.S. PATENT DOCUMENTS

| | | | |
|---|---|---|---|
| 1,736,265 A * | 11/1929 | Kelly ................. | A47J 31/0631 99/315 |
| 3,345,935 A * | 10/1967 | Waline ............... | B65D 85/8061 99/298 |
| 3,420,675 A * | 1/1969 | Costas ............... | B65D 85/8043 426/77 |
| 3,985,069 A * | 10/1976 | Cavalluzzi ......... | B65D 85/8061 426/77 |
| 4,446,158 A * | 5/1984 | English .............. | A47J 31/02 D7/400 |
| 5,082,676 A * | 1/1992 | Love .................. | B65D 85/8055 426/77 |
| 5,942,143 A | 8/1999 | Hartman et al. | |
| 6,318,244 B1 * | 11/2001 | Justus ................ | A47J 31/0615 99/279 |
| 6,777,007 B2 * | 8/2004 | Cai .................... | A47J 31/0647 206/0.5 |
| 6,948,420 B2 | 8/2005 | Kirschner et al. | |
| 7,322,277 B2 | 1/2008 | Halliday et al. | |
| 7,815,953 B2 | 10/2010 | Mastropasqua et al. | |
| 8,640,604 B2 | 2/2014 | Doglioni Majer | |
| 8,667,890 B2 | 3/2014 | Macchi | |
| 2005/0204925 A1 * | 9/2005 | Orrico .................. | A47J 31/547 99/275 |
| 2006/0137533 A1 * | 6/2006 | Wise .................... | A47J 31/06 99/279 |
| 2008/0148955 A1 * | 6/2008 | Neace .................. | A47J 31/002 99/279 |
| 2008/0264268 A1 * | 10/2008 | Tjen ..................... | A47J 31/02 99/323.3 |

(Continued)

FOREIGN PATENT DOCUMENTS

DE  102011003567 A1  8/2012
WO       8810077 A1  12/1988

*Primary Examiner* — Anthony J Weier
(74) *Attorney, Agent, or Firm* — Price Heneveld LLP (57) ABSTRACT

A beverage brewing assembly includes a body defining a cavity. An insert is removably positioned within the cavity of the body. The insert defines a plurality of compartments. A lid is operably coupled with the body and defines a plurality of through-holes. The plurality of through-holes are positioned to facilitate a consistent and evenly distributed flow through each of the plurality of compartments of the insert.

20 Claims, 9 Drawing Sheets

(56) References Cited

U.S. PATENT DOCUMENTS

| | | | | |
|---|---|---|---|---|
| 2008/0317931 A1* | 12/2008 | Mandralis | ............... | A23F 5/24 |
| | | | | 426/594 |
| 2009/0311384 A1* | 12/2009 | MacMahon | ............ | A23C 11/08 |
| | | | | 426/77 |
| 2014/0166654 A1* | 6/2014 | Lane | ................. | B65D 39/08 |
| | | | | 220/262 |
| 2015/0017290 A1* | 1/2015 | Rondelli | ............... | A23F 5/262 |
| | | | | 426/115 |
| 2015/0366395 A1* | 12/2015 | Do | ................. | A47J 31/0615 |
| | | | | 99/323 |
| 2016/0166103 A1* | 6/2016 | Morse | ................ | A47J 31/20 |
| | | | | 99/297 |
| 2016/0183713 A1* | 6/2016 | Simpson | ............ | A47J 31/0605 |
| | | | | 99/298 |
| 2017/0042361 A1 | 2/2017 | Kim | | |
| 2017/0121065 A1* | 5/2017 | Nguyen | ................ | A47J 31/02 |
| 2018/0127202 A1* | 5/2018 | Stewart | ................ | C12G 3/00 |
| 2019/0053511 A1* | 2/2019 | Gelov | ................ | A47J 31/44 |
| 2020/0121115 A1* | 4/2020 | Oh | ................. | A47J 31/0652 |
| 2020/0154932 A1* | 5/2020 | Rivera | ............. | A47J 31/4403 |
| 2020/0281393 A1* | 9/2020 | Giordano | ............ | B30B 9/26 |
| 2022/0008849 A1* | 1/2022 | Arcangeli | .......... | A47J 31/0663 |

* cited by examiner

BEVERAGE BREWING ASSEMBLY

BACKGROUND OF THE DISCLOSURE

The present disclosure generally relates to a beverage brewing assembly, and more specifically, to a gravity-fed beverage brewing assembly.

SUMMARY OF THE DISCLOSURE

According to one aspect of the present disclosure, a beverage brewing assembly includes a body defining a cavity. An insert is removably positioned within the cavity of the body. The insert defines a plurality of compartments. A lid is operably coupled with the body and defines a plurality of through-holes. The plurality of through-holes are positioned to facilitate a consistent and evenly distributed flow through each of the plurality of compartments of the insert.

According to another aspect of the present disclosure, a gravity-fed beverage brewing assembly includes a body defining a cavity and having a bottom wall. The bottom wall defines an aperture in communication with the cavity. A plurality of ribs is positioned within the body and extends from an open end of the body to the bottom wall. An insert includes a perimeter wall and a plurality of interior walls. The plurality of interior walls define a plurality of compartments. The insert is at least partially supported by the plurality of ribs. A lid is operably coupled with the body. The lid includes an upper rim and a lower rim. The lower rim is at least partially received by the open end of the body. The lid also defines a plurality of through-holes.

According to yet another aspect of the present disclosure, a method for manufacturing a gravity-fed beverage brewing assembly includes a step of forming a body defining a cavity and having a plurality of ribs. The method further includes a step of forming an insert configured to be received by the cavity and defining a plurality of compartments sized to receive a predetermined portion of beverage brewing materials. The method also includes a step of forming a lid configured to operably couple with the body. Another step of the method includes defining a plurality of through-holes through the lid in a predetermined pattern configured to optimize liquid flow through the plurality of through-holes and the plurality of compartments, wherein the predetermined pattern is defined so that the liquid flow is equally and consistently distributed into the plurality of compartments.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

The present illustrated embodiments reside primarily in combinations of method steps and apparatus components related to a beverage brewing assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art, having the benefit of the description herein. Further, like numerals in the description and drawings represent like elements.

Figure 1:
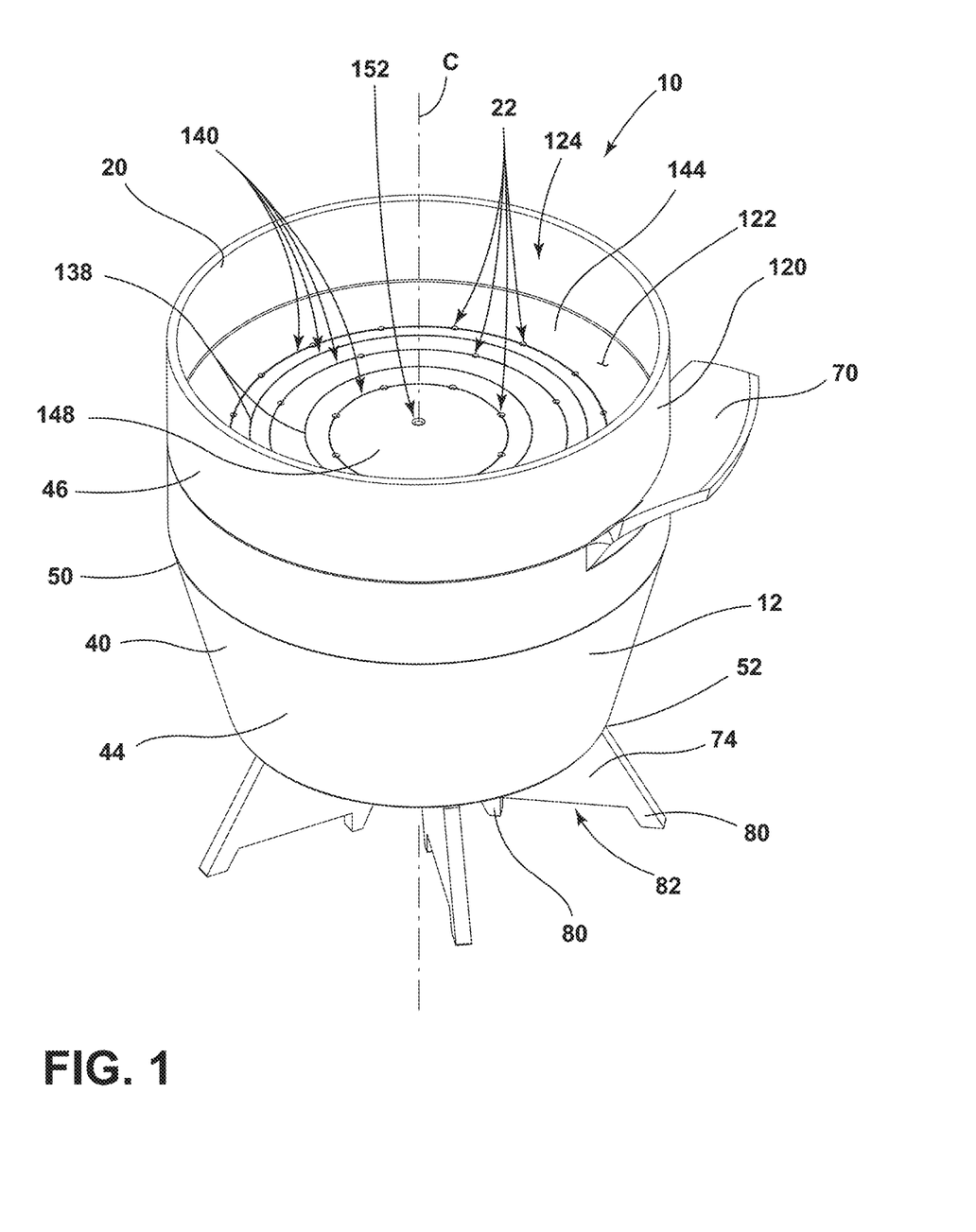
FIG. 1 is a top perspective view of a beverage brewing assembly, according to various examples.
Figure 2:
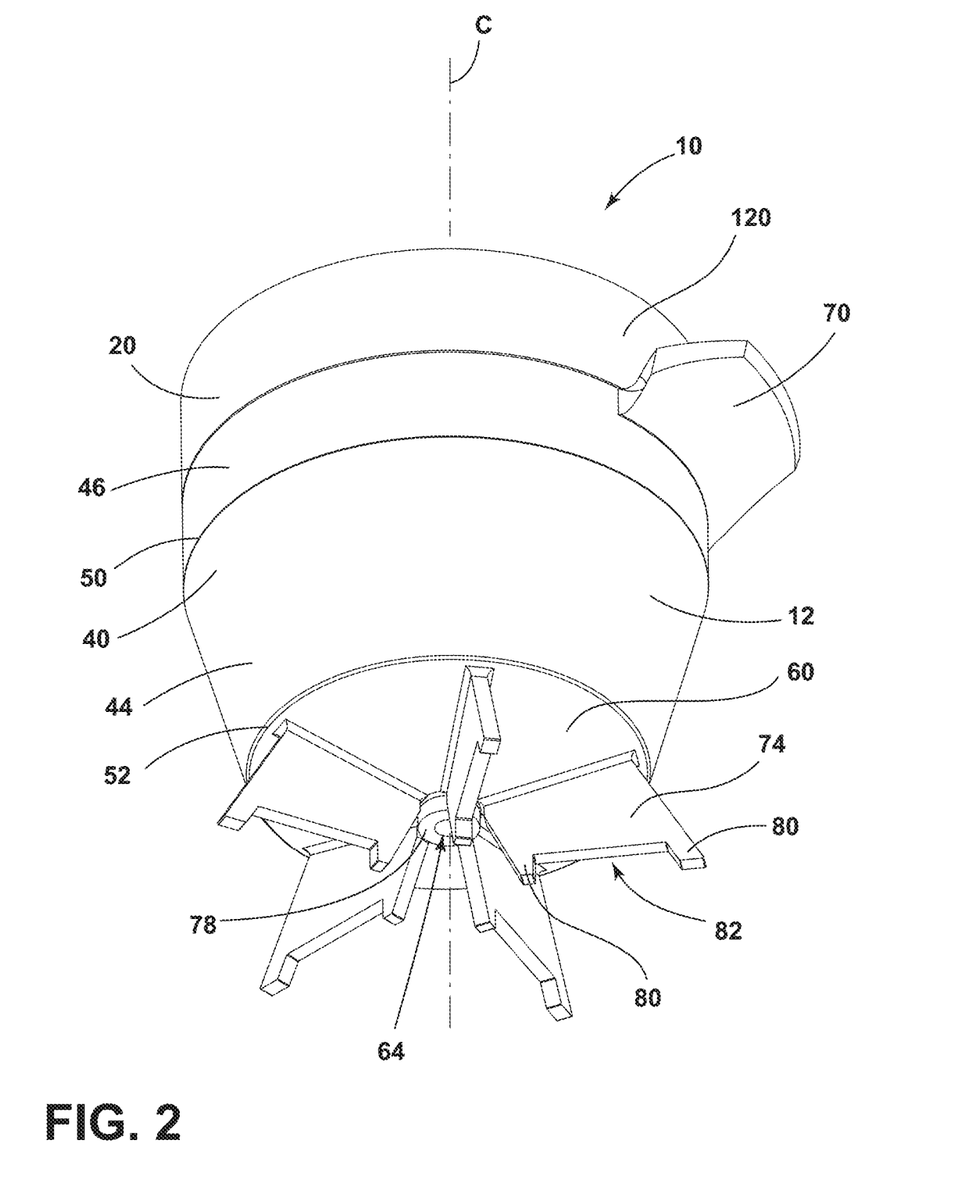
FIG. 2 is a bottom perspective view of the beverage brewing assembly of FIG. 1.

For purposes of description herein, the terms "upper," "lower," "right," "left," "rear," "front," "vertical," "horizontal," and derivatives thereof shall relate to the disclosure as oriented in FIG. 1. Unless stated otherwise the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring now to FIGS. 1-8, reference numeral 10 generally designates a gravity-fed beverage brewing assembly. The beverage brewing assembly 10 includes a body 12 defining a cavity 14. An insert 16 is removably positioned within the cavity 14 of the body 12. The insert 16 defines a plurality of compartments 18. A lid 20 is operably coupled with the body 12. The lid 20 defines a plurality of through-holes 22. The plurality through-holes 22 are positioned to facilitate a consistent and evenly distributed flow of a liquid along a liquid flow path 24 through each of the plurality of compartments 18.

Figure 3A:
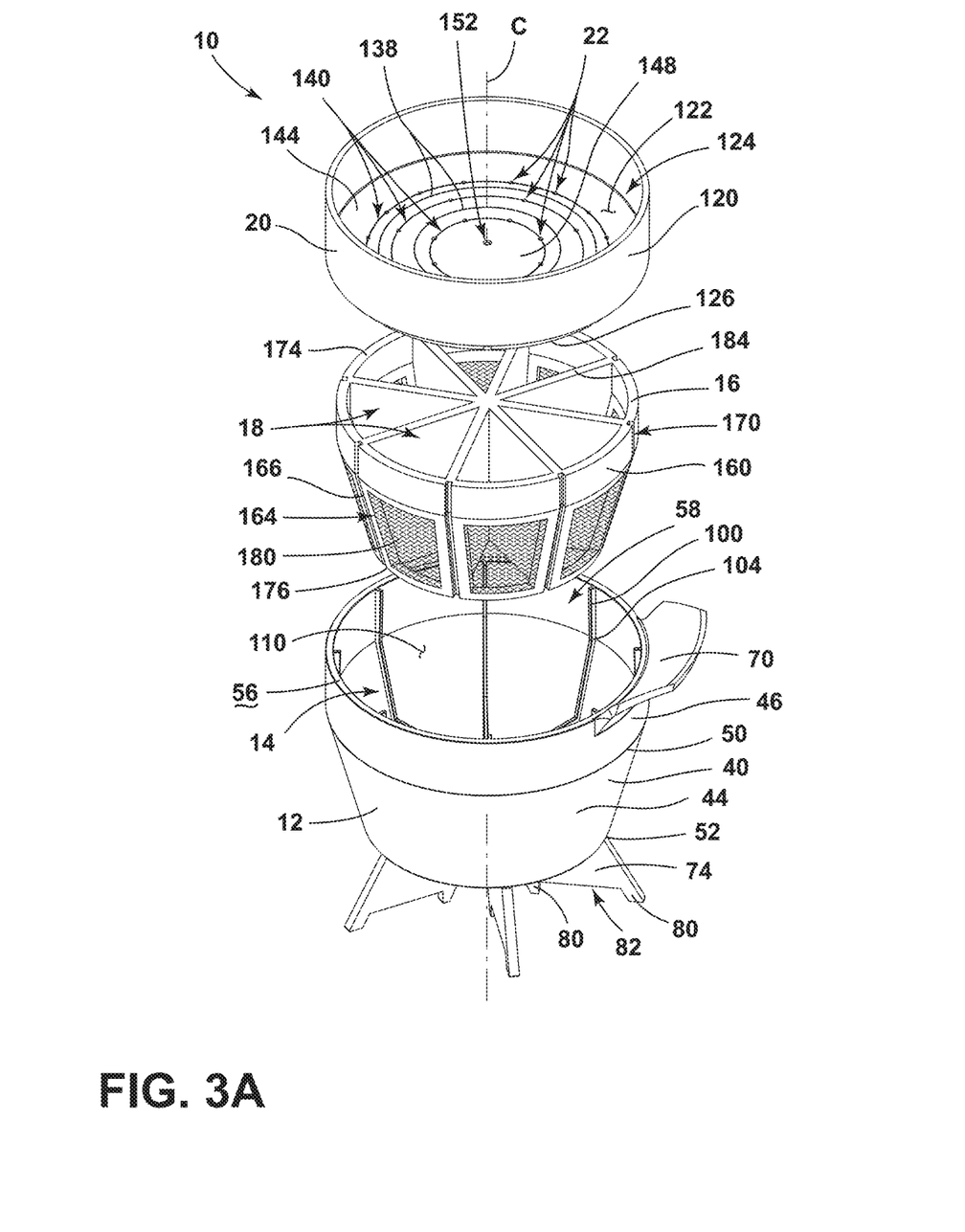
FIG. 3A is an exploded top perspective view of the beverage brewing assembly of FIG. 1.
Figure 3B:
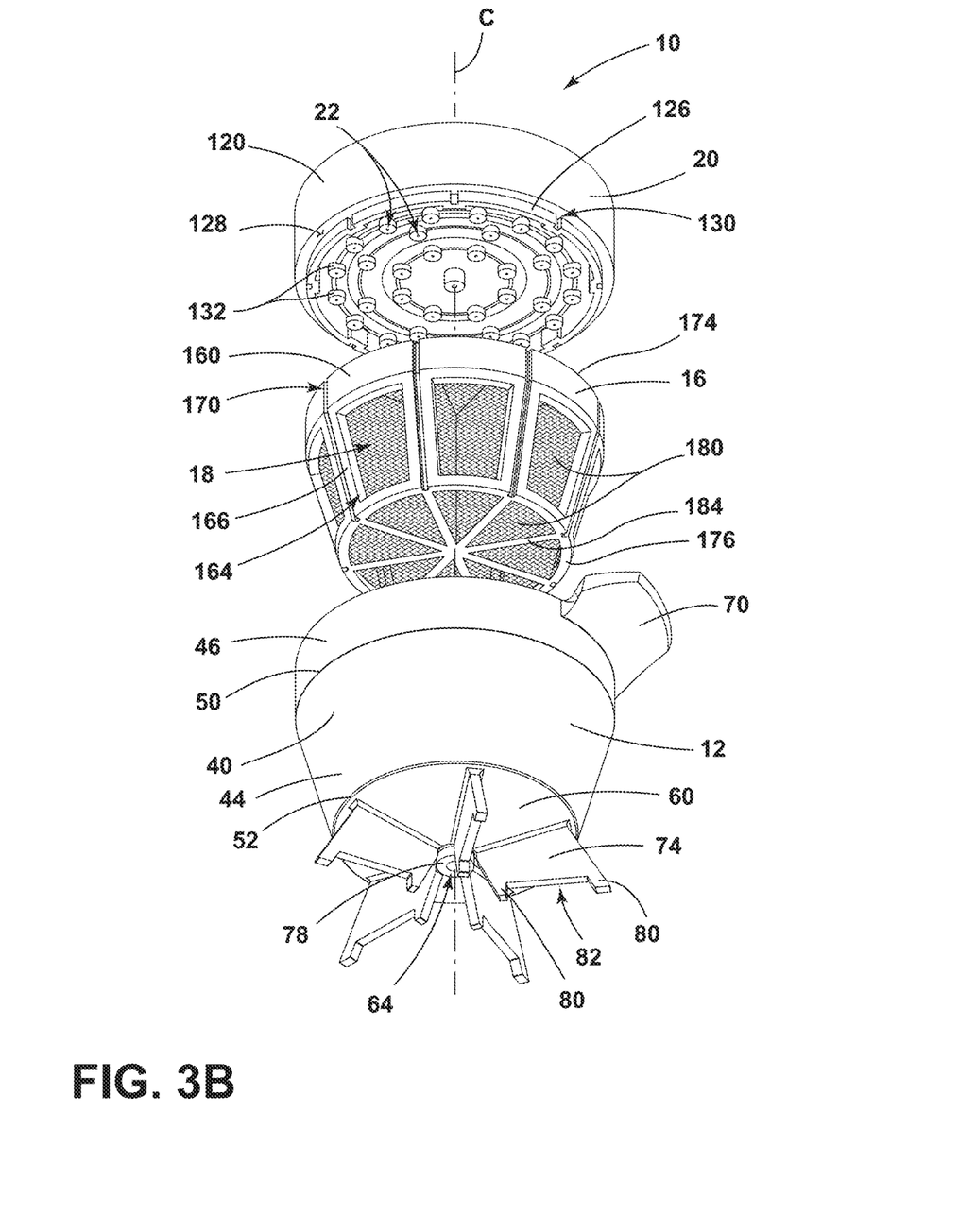
FIG. 3B is an exploded bottom perspective view of the beverage brewing assembly of FIG. 1.

Referring now to FIGS. 1-3B, the beverage brewing assembly 10 is illustrated assembled (FIGS. 1 and 2) and disassembled (FIGS. 3A and 3B). The body 12 includes a perimeter wall 40 and defines the cavity 14. In various examples, the perimeter wall 40 has a first portion 44 and a second portion 46. The first portion 44 may be at least partially frustoconical. In other words, an upper end 50 of the first portion 44 may have a first diameter D1 and a lower end 52 of the first portion 44 may have a second diameter D2. The first diameter D1 is greater than the second diameter D2 so that the perimeter wall 40 slopes downward and inward (FIG. 4B).

The second portion 46 of the body 12 extends upward from the upper end 50 of the first portion 44 of the body 12. The second portion 46 of the body 12 is formed as a ring having a substantially consistent diameter throughout. The diameter of the second portion 46 is substantially the same as the first diameter of the first portion 44. The second portion 46 extends circumferentially about the upper end 50 of the first portion 44 of the body 12. The second portion 46 may have an upper edge surface 56 configured to support the lid 20, as discussed elsewhere herein. The upper edge surface 56 may be substantially perpendicular to a centerline C of the beverage brewing assembly 10. Alternatively, the upper edge surface 56 may be sloped inward toward the centerline C or outward and away from the centerline C. The upper edge surface 56 is configured to surround an open end 58 of the body 12 configured to at least partially receive the lid 20, as discussed in more detail below.

Referring still to FIGS. 1-3B, at the lower end 52 of the first portion 44, the perimeter wall 40 of the body 12 may be integrally formed or operably connected to a bottom wall 60 of the body 12. In various examples, the bottom wall 60 may be operably coupled with the first portion 44 of the perimeter wall 40 between the upper end 50 and the lower end 52 of the first portion 44. In other examples the bottom wall 60 may be coupled with the first portion 44 of the perimeter wall 40 at the lower end 52 of the first portion 44 such that the perimeter wall 40 does not overlap the bottom wall 60 of the body 12. The bottom wall 60 of the body 12 defines an aperture 64 that is typically positioned along the centerline C of the beverage brewing assembly 10. The bottom wall 60 may be sloped downward from the lower end 52 of the first portion 44 of the perimeter wall 40 towards the aperture 64, forming an inverted cone configured to direct the liquid flow path 24 to the aperture 64. The slope of the bottom wall 60 and corresponding liquid flow path 24 facilitate liquid passing through the body 12 without being obstructed by other surfaces and/or features (e.g., pooling at uneven portions of the bottom wall 60). It will be understood that the body 12 of the beverage brewing assembly 10 may be configured to be independent of any other beverage brewing apparatus or may be configured to work in conjunction with another beverage brewing apparatus (e.g., an automated coffee maker) without departing from the scope of the present disclosure. For example, the body 12 of the beverage brewing assembly 10 may be configured to be inserted into, or integrally formed with, a filter basket of another beverage brewing apparatus.

The body 12 of the beverage brewing assembly 10 may further include a handle 70. The handle 70 may be positioned proximate the upper end 50 of the first portion 44 of the perimeter wall 40. Alternatively, the handle 70 may extend from the second portion 46 of the perimeter wall 40. Where the handle 70 extends from the second portion 46, the handle 70 may be positioned proximate the upper edge surface 56 of the second portion 46. The handle 70 may be formed as a scoop-shaped handle extending outwardly from the body 12 and configured to be gripped or held by a user when the beverage brewing assembly 10 is in use. In other examples, the handle 70 may be formed generally as a curved handle, a linear handle, or any other form of handle configured to be used by a user to support a vessel.

Figure 7:
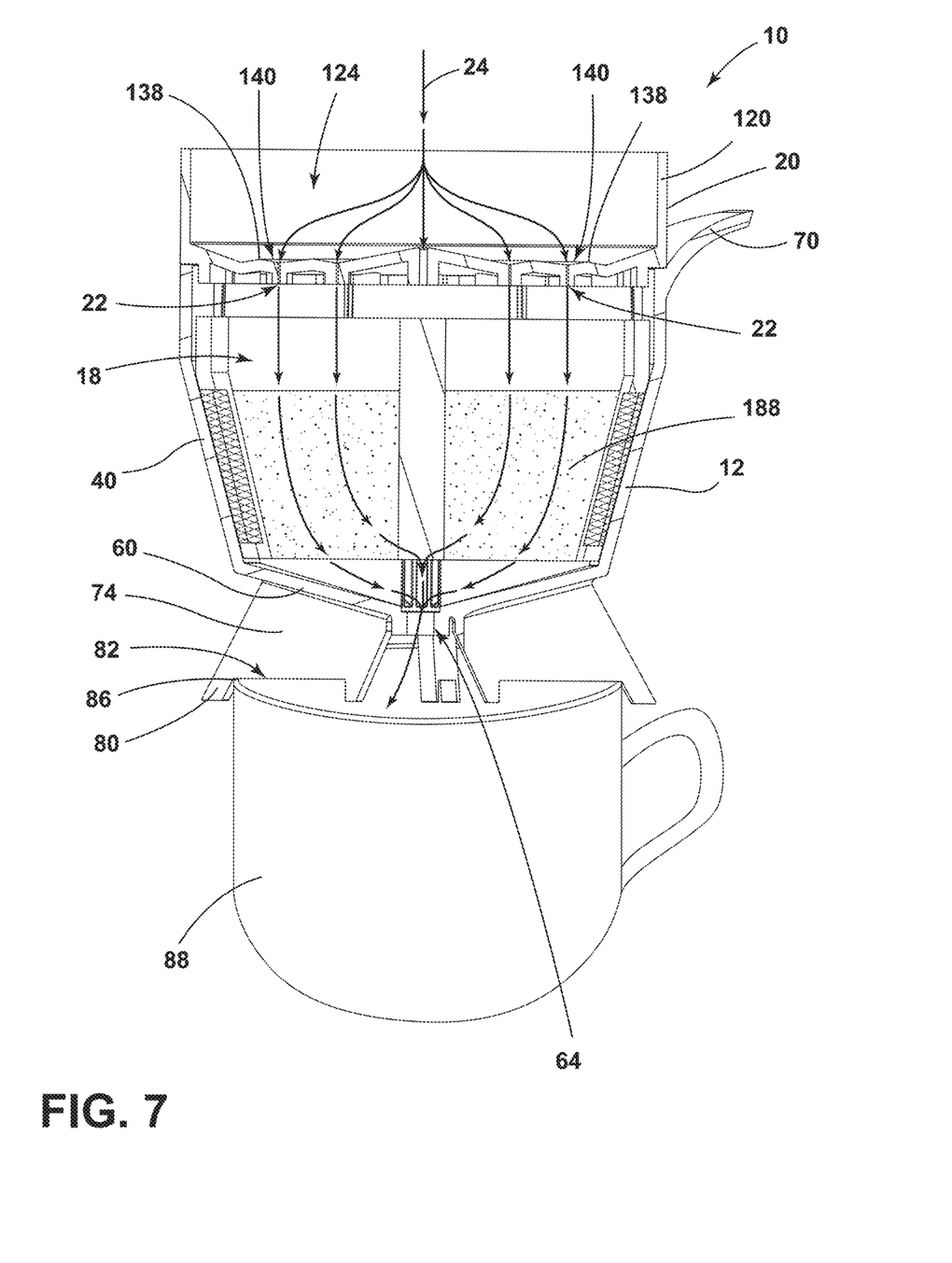
FIG. 7 is a cross-sectional view of the beverage brewing assembly of FIG. 6 with a beverage brewing material disposed therein.

The body 12 typically includes a plurality of legs 74 operably coupled and/or integrally formed with the bottom wall 60 of the body 12. The plurality of legs 74 may extend downward from the bottom wall 60 of the body 12. The plurality of legs 74 may extend radially from the perimeter wall 40 of the body 12 towards the aperture 64 defined by the bottom wall 60 of the body 12. In various examples, the aperture 64 may be surrounded by a rim 78. Where the aperture 64 is surrounded by the rim 78, the plurality of legs 74 may abut and/or be integrally formed with the rim 78 of the bottom wall 60. Each of the plurality of legs 74 may be generally angled outward from the aperture 64 and/or the centerline C of the beverage brewing assembly 10 to form a support structure for the body 12. Each of the plurality of legs 74 may include one or more feet 80. The one or more feet 80 may be positioned to frame a cutout 82 extending radially towards the centerline C. The cutouts 82 are configured with a size and shape to allow a rim edge 86 of a receptacle 88 (e.g., a mug, a cup, a carafe, a pitcher, etc.) to be positioned within the cutouts 82 of the plurality of legs 74 such that the body 12 rests on the rim edge 86 of the receptacle 88 (FIG. 7).

Referring now to FIGS. 3A and 3B, the body 12 further includes a plurality of ribs 100. The plurality of ribs 100 are evenly and circumferentially spaced about the perimeter wall 40 of the body 12. The body 12 may include any number of ribs 100 greater than two. For example, as illustrated, the body 12 may include eight ribs 100.

Figure 4A:
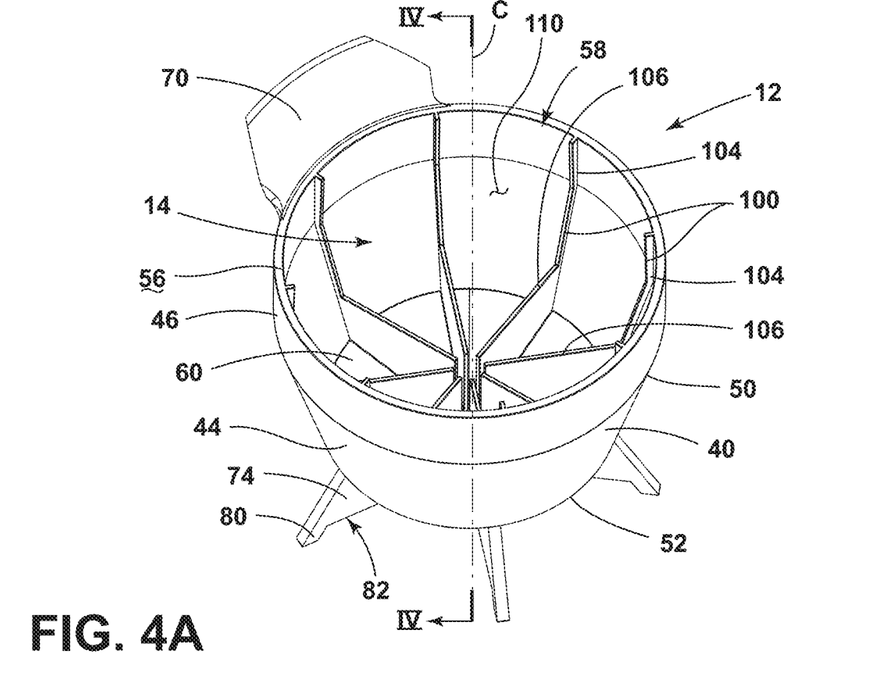
FIG. 4A is a top perspective view of an aspect of a boy of a beverage brewing assembly, according to various examples
Figure 4B:
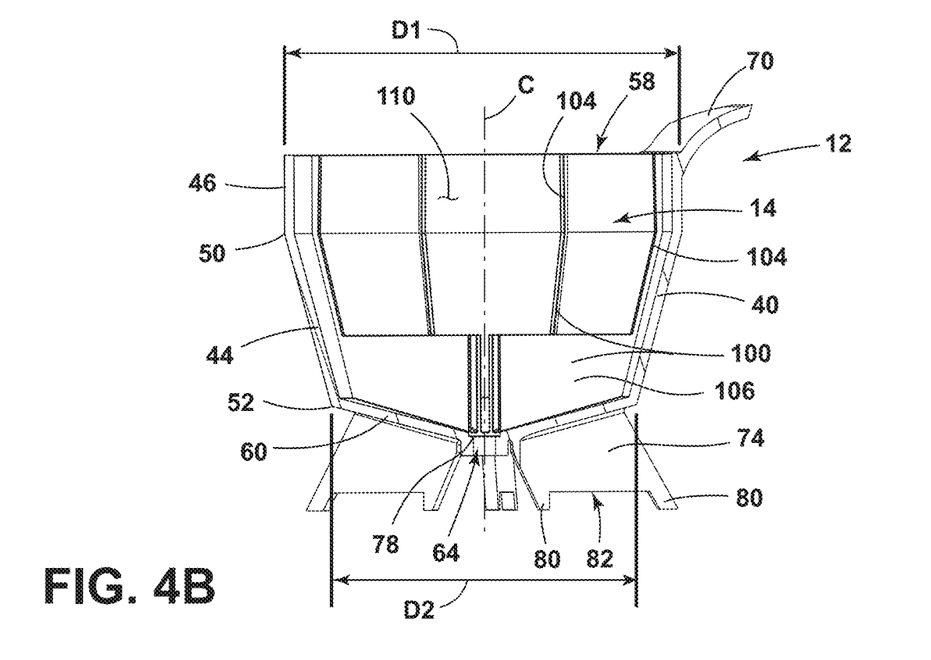
FIG. 4B is a cross-sectional view of the body of the beverage brewing assembly of FIG. 4A taken along line IV-IV, according to various examples.
Figure 5A:
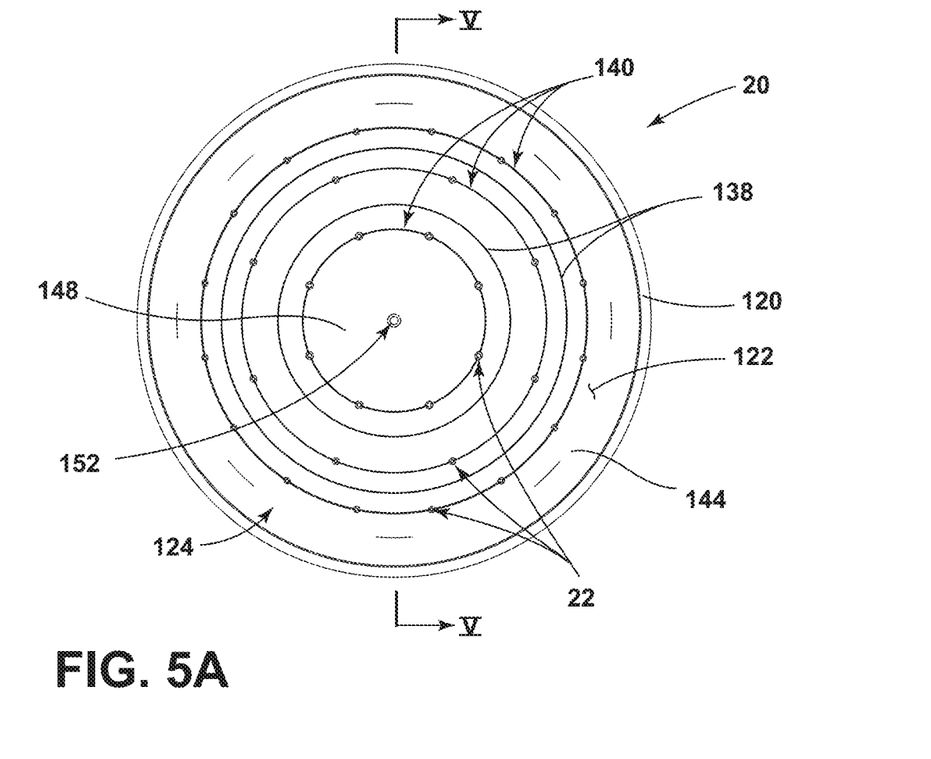
FIG. 5A is a top elevation view of a lid of a beverage brewing assembly, according to various examples.
Figure 5B:
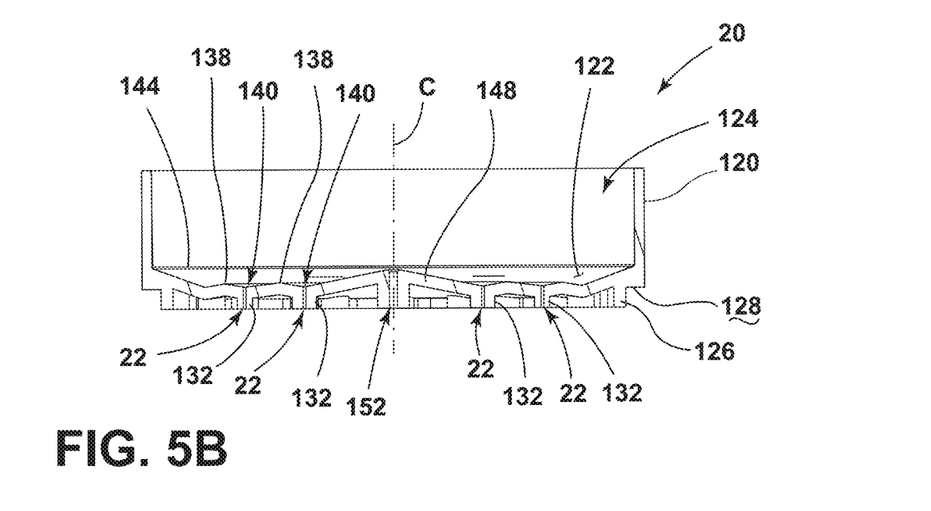
FIG. 5B is a cross-sectional view of the lid of FIG. 5A taken along line V-V.

Referring now to FIGS. 4A and 4B, each of the plurality of ribs 100 has an upper portion 104 and a lower portion 106. The upper portion 104 of each of the plurality of ribs 100 extends radially toward the centerline C from an inner surface 110 of the perimeter wall 40. The upper portion 104 of each of the plurality of ribs 100 extends from the upper edge surface 56 of the second portion 46 of the perimeter wall 40 and downward toward the aperture 64 of the bottom wall 60. The lower portion 106 of each of the plurality of ribs 100 is integrally formed with the respective upper portion 104. The lower portion 106 extends from the inner surface 110 of the perimeter wall 40 towards the centerline C along the bottom wall 60. The lower portion 106 further extends upward from the bottom wall 60. In other words, the lower portion 106 of each of the plurality of ribs 100 extends along the bottom wall 60 of the body 12 toward the aperture 64. The upper portion 104 of each of the plurality of ribs 100 extends upward from the respective lower portion 106 and along the inner surface 110 of the perimeter wall 40 up to the upper edge surface 56 of the second portion 46 of the perimeter wall 40. The plurality of ribs 100 may be sized to at least partially support the insert 16, as discussed elsewhere herein. Further, it will be understood that only a portion of the plurality of ribs 100 may include the lower portion 106. Typically, the number of ribs 100 having the lower portion 106 is sufficient to support the insert 16. In various examples, the plurality of ribs 100 may be equally spaced about the circumference of body 12. In other examples, the distribution of the plurality of ribs 100 may be variable and/or randomized.

Referring again to FIGS. 1-3B, 5A, and 5B, when the beverage brewing assembly 10 is assembled, the body 12 is operably coupled with the lid 20. The lid 20 includes an upper rim 120 extending upward from an upper surface 122 of the lid 20. The upper rim 120 extends circumferentially about a perimeter of the lid 20 and is configured to enclose an area 124 above the upper surface 122 so that liquid may be poured into the lid 20. The upper rim 120 defines the area 124 for receiving and retaining liquid poured onto the lid 20. The lid 20 further includes a lower rim 126 extending downward from a lower surface 128 of the lid 20. The lower surface 128 is shaped to complement the upper edge surface 56 of the perimeter wall 40 of the body 12. The lower rim 126 has a diameter that is less than the diameter of the upper rim 120 so that the lower rim 126 is sized to be positioned within the open end 58 of the body 12. A plurality of extending rims 132 may extend from the lower surface 128 within the lower rim 126 and may be positioned to frame the plurality of through-holes 22.

The lower rim 126 may define a plurality of notches 130 circumferentially spaced about the lower rim 126. The number of notches of the plurality of notches 130 is the same number as the number of ribs of the plurality of ribs 100. Further, the spacing of the plurality of notches 130 is configured to complement the spacing of the plurality of ribs 100. When the lid 20 is coupled with the body 12, the plurality of notches 130 are configured to engage with upper ends of the upper portions 104 of the plurality of ribs 100 to align the lid 20 with the body 12. When the plurality of notches 130 are aligned with the plurality of ribs 100, the lower rim 126 is received by the open end 58 of the body 12 and the lower surface 128 of the lid 20 abuts the upper edge surface 56 of the second portion 46 of the perimeter wall 40 of the body 12. The interaction between the plurality of ribs 100 and the plurality of notches 130 is configured to align the lid 20 such that the proper liquid flow path 24 through the lid 20 is achieved (FIG. 7).

The upper surface 122 of the lid 20 includes a plurality of raised rings 138. The plurality of raised rings 138 extend circumferentially about the lid 20 and are concentrically nested about the centerline C. It will be understood that any number of rings 138 may be used without departing from the scope of the present disclosure. Each of the plurality of raised rings 138 extends upward from the upper surface 122 and includes sloped and/or curved sides. The sloped and/or curved sides and the nesting of the plurality of raised rings 138 defines a plurality of valleys 140. Each of the sloped and/or curved sides is positioned proximate one of the plurality of valleys 140. The upper surface 122 of the lid 20 further includes a sloped outer edge 144. The sloped outer edge 144 is configured to slope downward toward the plurality of raised rings 138 and is positioned proximate the outermost raised ring 138 of the plurality of raised rings 138 to define one of the plurality of valleys 140.

The upper surface 122 of the lid 20 may further include a raised central portion 148. The raised central portion 148 is sloped downward toward the innermost valley 140 of the plurality of valleys 140 and may have a substantially conical shape. The innermost raised ring 138 of the plurality of raised rings 138 are positioned proximate and extends around the raised central portion 148. The raised central portion 148 and the innermost raised ring 138 of the plurality of rings 138 define one of the plurality of valleys 140. At an apex of the raised central portion 148, a central through-hole 152 may be defined. The central through-hole 152 may be defined to align with the centerline C of the beverage brewing assembly 10.

The lid 20 further defines the plurality of through-holes 22. The plurality of through-holes 22 are arranged within the plurality of valleys 140. Each of the plurality of valleys 140 includes through-holes 22 circumferentially spaced along the length of the valley 140. In various examples, the plurality of through-holes 22 may be evenly spaced within each of the plurality of valleys 140. In other examples, the plurality of through-holes 22 are variably spaced and positioned within the plurality of valleys 140. The plurality of through-holes 22 are positioned in a predetermined pattern to allow the liquid flow path 24 to pass through the through-holes 22 and through the lid 20 (see FIG. 7). The number of through-holes 22 of the plurality of through-holes 22 and the distribution of the plurality of through-holes 22 is selected to achieve an optimum flow of liquid through the plurality of compartments 18 of the insert 16, as discussed elsewhere herein.

Figure 6:
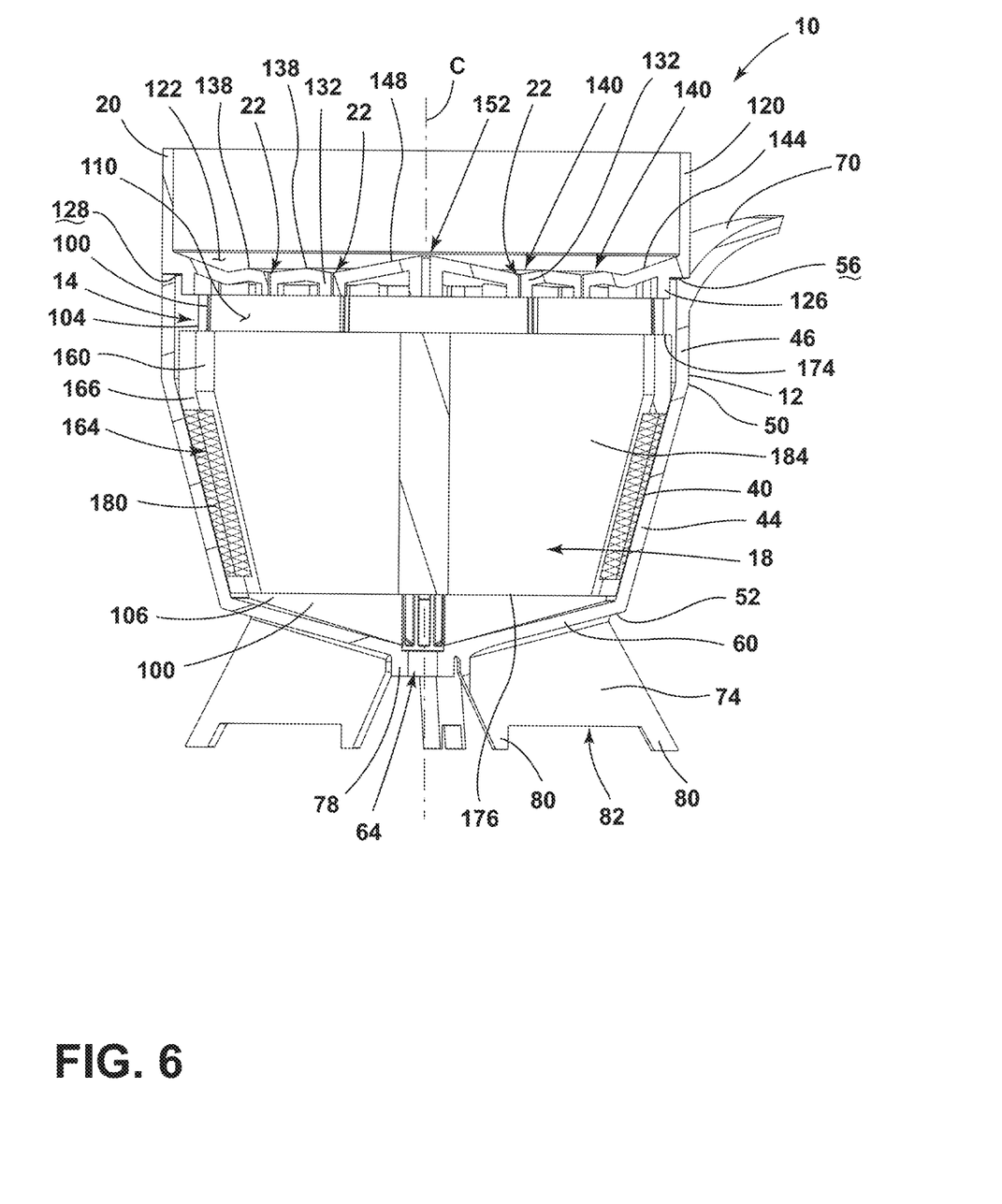
FIG. 6 is a cross-sectional view of a beverage brewing assembly, according to various examples.

Referring now to FIGS. 3A, 3B, and 6, the insert 16 includes a perimeter wall 160. The insert 16 is at least partially frustoconical in shape and is sized to be received by the cavity 14 of the body 12. The perimeter wall 160 defines a plurality of openings 164 circumferentially spaced about the perimeter wall 160 of the insert 16. Each of the plurality of openings 164 is defined and encompassed by a respective edge 166 extending about the perimeter of the respective opening 164. Each opening 164 of the plurality of openings 164 may be substantially trapezoidal in shape. Alternatively, each opening 164 of the plurality of openings 164 may be substantially square or rectangular in shape or may be shaped like any other higher-order polygon.

The perimeter wall 160 of the insert 16 includes a top end 174 and a bottom end 176. Each of the top and bottom ends 174, 176 are at least partially open. In various examples, each of the top and bottom ends 174, 176 are fully open ends. A plurality of channels 170 may be defined by the perimeter wall 160 from the top end 174 of the insert 16 to the bottom end 176 of the insert 16. Each of the plurality of channels 170 is positioned between two of the plurality of openings 164 and may extend at least partially along the respective edges 166. When the insert 16 is positioned within the cavity 14 of the body 12, the plurality of channels 170 are configured to receive a respective rib 100 of the plurality of ribs 100. The plurality of channels 170 are sized and spaced to complement the upper portions 104 of the plurality of ribs 100. In other words, the plurality of channels 170 may be circumferentially spaced about the perimeter wall 160 of the insert 16 and the spacing of the plurality of channels 170 may be configured to complement the spacing of the plurality of ribs 100.

A plurality of interior walls 184 extend radially inward from the perimeter wall 160 of the insert 16 toward the centerline C of the beverage brewing assembly 10. The plurality of interior walls 184 are interspaced between the plurality of openings 164 and may be substantially aligned with the plurality of channels 170. The plurality of interior walls 184 may have a number of interior walls 184 that corresponds with a number of ribs 100 of the plurality of ribs 100 of the body 12. Alternatively, the plurality of interior walls 184 may have a number of interior walls 184 that is greater than or less than the number of ribs 100 of the plurality of ribs 100. The plurality of interior walls 184 define the plurality of compartments 18 of the insert 16. In other words, the plurality of interior walls 184 separates the insert 16 into the plurality of compartments 18. Each of plurality of compartments 18 has a substantially wedge-shaped cross-section when viewed in top profile. Each of the plurality of compartments 18 is in communication with a corresponding opening 164 of the plurality of openings 164. Further, the number of interior walls 184 is selected to optimize the number of compartments 18 of the plurality of compartments 18 for evenly distributing the beverage brewing materials 188 (FIG. 7) throughout the insert 16 when the beverage brewing assembly 10 is in use.

In various examples, a filter material 180 may be positioned over each of the plurality of openings 164. The filter material 180 may be a mesh screen, or any other filter and may be formed of any suitable material including, for example, cloth, metal, or polymer(s). The filter material 180 is configured to act as a filter and retain beverage brewing material 188 within the insert 16, as discussed in more detail elsewhere herein. In various examples, the filter material 180 may also be positioned to cover the bottom end 176 of the insert 16.

In other examples, the plurality of openings 164 and the bottom end 176 of the insert 16 may be open. Each of the plurality of openings 164 and the bottom end 176 of the insert 16 may be configured to be covered by a removable filter material 180 extending about the exterior of the insert 16. The engagement between the plurality of channels 170 of the insert 16 of the plurality of ribs 100 of the body 12 may be configured to secure the removable filter material 180. The removable filter material 180 may be removable or disposable. Further, when the insert 16 is received by the cavity 14 of the body 12, the filter is configured to be secured between the bottom end 176 of the insert 16 and the lower portions 106 of the plurality of ribs 100.

Referring now to FIGS. 1-6, the plurality of through-holes 22 are positioned within the lid 20 to ensure an even distribution of liquid into the insert 16. This even distribution is possible regardless of the position of the lid 20 with respect to the body 12. In this manner, the plurality of notches 130 of the lower rim 126 of the lid 20 and the plurality of ribs 100 of the body 12 ensure proper alignment between the through-holes 22 and the areas defined by the plurality of ribs 100. This alignment, in turn, ensures that the plurality of through-holes 22 are aligned with the individual compartments 18 of the plurality of compartments 18 of the insert 16. As disclosed herein, the insert 16 is positioned such that the plurality of channels 170 also align with the plurality of ribs 100. Accordingly, using the plurality of ribs 100, the lid 20, the insert 16, and the body 20 are properly aligned to ensure that each compartment 18 of the plurality of compartments 18 of the insert 16 has a respective and identical number of corresponding through-holes 22.

Referring now to FIGS. 1-7, in use, the beverage brewing assembly 10 is configured to use gravity to guide liquid along a liquid flow path 24 defined by the beverage brewing assembly 10. As discussed above, the body 12 of the beverage brewing assembly 10 is positioned over or resting on a rim edge 86 of a receptacle 88. The insert 16 is configured to be selectively received within the cavity 14 of the body 12. The insert 16 is positioned so that the plurality of channels 170 are aligned with the upper portions 104 of the plurality of ribs 100. When the insert 16 is positioned within the cavity 14 of the body 12, the insert 16 is supported by the lower portions 106 of the plurality of ribs 100. The beverage brewing materials 188 are positioned within each of the plurality of compartments 18 of the insert 16. The beverage brewing materials 188 may be any material configured to flavor liquid including, for example, coffee grounds or tea leaves. The beverage brewing materials 188 are generally distributed equally throughout the plurality of compartments 18. When the beverage brewing materials 188 are positioned within the insert 16, the lid 20 is configured to be operably coupled with the body 12. The lid 20 is positioned so that the plurality of notches 130 are aligned with the upper portions 104 of the plurality of ribs 100. The lid 20 is operably coupled with the body 12 so that the lower surface 128 of the lid 20 abuts and/or is flush with the upper edge surface 56 of the body 12. The handle 70 may be used to stabilize the beverage brewing assembly 10 as the components are assembled.

When the beverage brewing assembly 10 is assembled with beverage brewing materials 188 within the insert 16, liquid (e.g., water) may be poured into the lid 20. The liquid flows along the liquid flow path 24, as illustrated in FIG. 7. The liquid passes from the lid 20 through the plurality of through-holes 22 and/or the central through-hole 152 of the lid 20. The liquid is evenly distributed by the plurality of through-holes 22 into the plurality of compartments 18. The liquid passes along the liquid flow path 24 through the beverage brewing materials 188 within the insert 16. The rate of the flow of the liquid through the beverage brewing materials 188 is optimized by the previously discussed structure of the beverage brewing assembly 10. The rate of flow is selected/optimized to provide a beverage that has limited acidity. Undesirable or excessive levels of acidity can results from overexposure to the beverage brewing materials 188. Use of the beverage brewing assembly 10 limits this acidity while still providing the brewing time necessary to achieve the necessary strength of the brewed beverage.

Referring now to FIGS. 1-8, a method 190 of manufacturing the gravity-fed beverage brewing assembly 10 described above includes a step 192 of forming a body 12 having a perimeter wall 40 and defining a cavity 14. The body 12 further includes a plurality of ribs 100 extending from an inner surface 110 of the perimeter wall 40. Forming an insert 16 configured to be received by the cavity 14 of the body 12 (step 194) ensures that the insert 16 can be removably coupled with the body 12. The insert 16 is formed to define a plurality of compartments 18.

Figure 8:
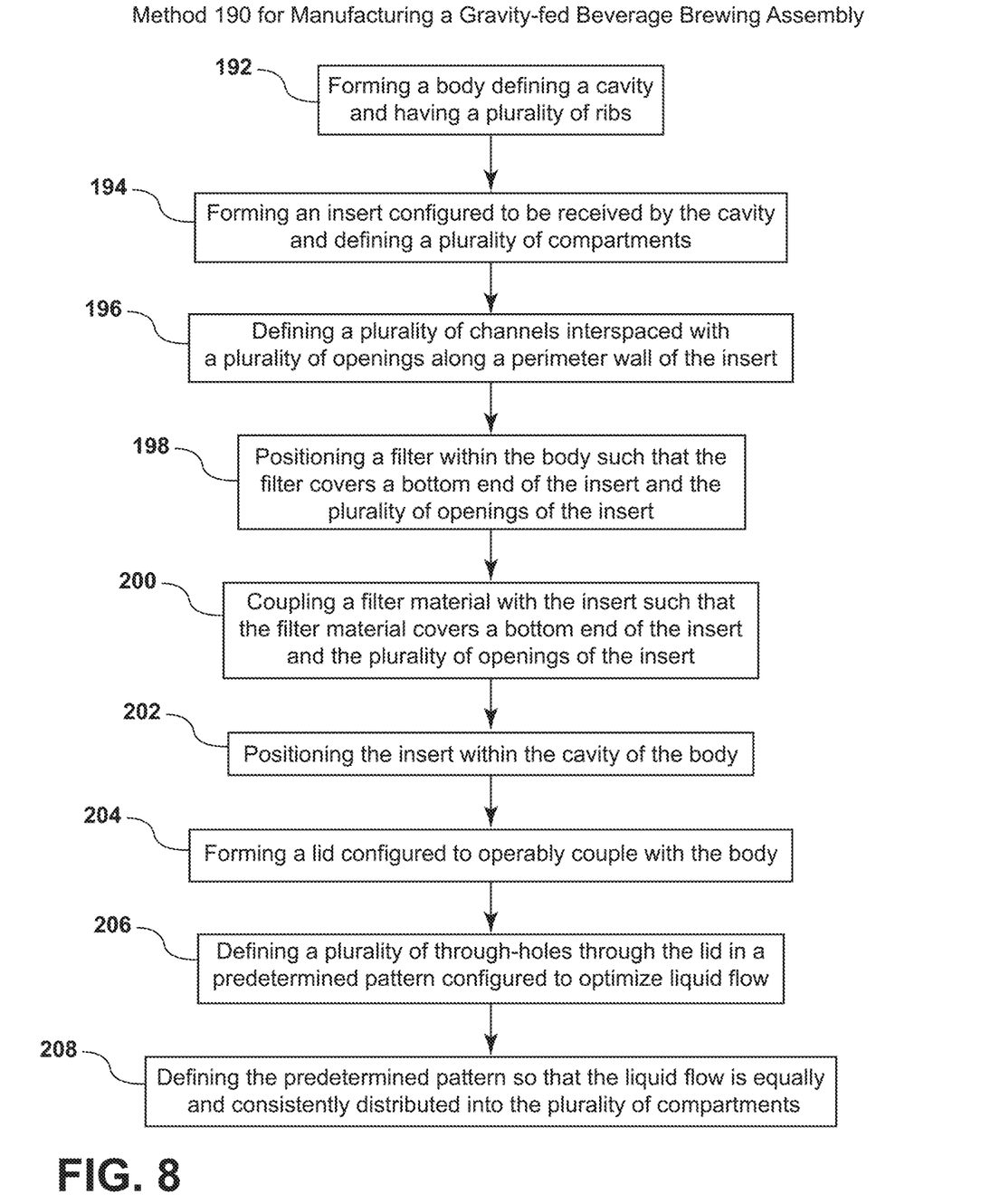
FIG. 8 is a flow diagram of a method of manufacturing a gravity-fed beverage brewing assembly.

Another step 196 includes defining a plurality of channels 170 within a perimeter wall 160 of the insert 16. The plurality of channels 170 are interspaced with a plurality of openings 164 of the insert 16. The plurality of channels 170 and the plurality of openings 164 extend circumferentially about the perimeter wall 160 of the insert 16. The step 196 further includes defining the plurality of openings 164 of the insert 16 so that the plurality of openings 164 correspond with the plurality of compartments 18 and defining the plurality of channels 170 so that the plurality of channels 170 align with the plurality of ribs 100 of the body 12.

Yet another step 198 of the method 190 includes positioning a filter formed of filter material 180 within the body 12 such that the filter material 180 of the filter covers one or both of a bottom end 176 of the insert 16 and the plurality of openings 164 of the insert 16 when the insert 16 is positioned within the cavity 14 of the body 12. An alternative step 200 includes coupling the filter material 180 directly with the insert 16 such that the filter material 180 covers the bottom end 176 of the insert 16 and the plurality of openings 164 of the insert 16.

The method 190 further includes a step 202 of positioning the insert 16 within the cavity 14 of the body 12. When the insert 16 is positioned within the cavity 14 the plurality of ribs 100 are received by the plurality of channels 170. The engagement between the plurality of ribs 100 and the plurality of channels 170 is configured to guide insertion of the insert 16 into the cavity 14 of the body 12.

Another step 204 of the method 190 includes forming a lid 20 configured to operably couple with the body 12. The step 204 may be done in conjunction with yet another step 206 that includes defining a plurality of through-holes 22 through the lid 20 in a predetermined pattern. The predetermined pattern is configured to optimize liquid flow along the liquid flow path 24 through the lid 20 and into the plurality of compartments 18 defined by the insert 16. Yet another step 208 includes defining the predetermined pattern of the plurality of through-holes 22 so that the liquid flow path 24 distributes the liquid flow substantially equally and consistently into the plurality of compartments 18 of the insert 16. The beverage brewing assembly 10 may be used for brewing beverages as discussed above when the components are fully assembled as illustrated in at least FIGS. 6 and 7.

Use of the beverage brewing assembly 10 ensures that liquid moving from the lid 20 to the aperture 64 moves through the beverage brewing material 188 in a consistent and repeatable rate of time. Using the plurality of compartments 18 of the insert 16, a consistent amount of the beverage brewing material 188 can be located within each compartment 18 of the plurality of compartments 18 of the insert 16, and a consistent amount of liquid can be moved through each compartment 18 of the plurality of compartments 18. With this configuration, the liquid spends a predictable and repeatable amount of time passing through the beverage brewing material 188. The plurality of through-holes 22 ensures that a specific amount of liquid and a specific rate of liquid falls into each of the plurality of compartments 18 for passing through the beverage brewing material 188.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A beverage brewing assembly comprising:
   a body defining a cavity;
   an insert removably positioned within the cavity of the body, wherein the insert defines a plurality of compartments, wherein the body includes a plurality of ribs, each of the plurality of ribs including an upper portion and a lower portion, and further wherein the insert is supported by the lower portion of the plurality of ribs; and
   a lid operably coupled with the body and defining a plurality of through-holes, wherein the plurality of through-holes are positioned to facilitate a consistent and evenly distributed flow through each of the plurality of compartments of the insert.

2. The beverage brewing assembly of claim 1, wherein the body is at least partially frustoconical and includes a bottom wall sloped radially downward toward a centerline of the beverage brewing assembly.

3. The beverage brewing assembly of claim 1, wherein the body includes a plurality of legs, each of the plurality of legs defining a cutout configured to receive a rim edge of a receptacle.

4. The beverage brewing assembly of claim 1, wherein the lid includes an upper rim extending upward from an upper surface and configured to define an area for receiving and temporarily retaining liquid poured over the lid.

5. The beverage brewing assembly of claim 1, wherein the lid includes a plurality of raised rings defining a plurality of valleys, and further wherein the plurality of through-holes are defined within the plurality of valleys, respectively.

6. The beverage brewing assembly of claim 1, wherein the insert includes a plurality of interior walls extending from a perimeter wall of the insert, wherein the plurality of interior walls define and separate the plurality of compartments.

7. The beverage brewing assembly of claim 6, wherein the perimeter wall of the insert defines a plurality of openings, each of the plurality of openings defined to be in communication with one of the plurality of compartments.

8. A gravity-fed beverage brewing assembly, comprising:
   a body defining a cavity and having a bottom wall defining an aperture in communication with the cavity;
   a plurality of ribs positioned within the body and extending from an open end of the body to the bottom wall;
   an insert including a perimeter wall and a plurality of interior walls, wherein the plurality of interior walls define a plurality of compartments, and further wherein the insert is at least partially supported by the plurality of ribs; and a lid operably coupled with the body, the lid including an upper rim and a lower rim, wherein the lower rim is at least partially received by the open end of the body, and further wherein the lid defines a plurality of through-holes.

9. The gravity-fed beverage brewing assembly of claim 8, wherein each rib of the plurality of ribs includes an upper portion and a lower portion, wherein the lower portion extends along the bottom wall of the body and the upper portion extends upward from the lower portion to the open end of the body.

10. The gravity-fed beverage brewing assembly of claim 8, wherein the lower rim of the lid defines a plurality of notches, the plurality of notches configured to align with the plurality of ribs.

11. The gravity-fed beverage brewing assembly of claim 10, wherein the plurality of through-holes are defined to be equally distributed between the plurality of compartments when the plurality of notches are aligned with the plurality of ribs.

12. The gravity-fed beverage brewing assembly of claim 8, wherein the perimeter wall of the insert defines a plurality of openings, and further wherein each opening of the plurality of openings is in communication with a respective compartment of the plurality of compartments.

13. The gravity-fed beverage brewing assembly of claim 12, wherein the perimeter wall of the insert defines a plurality of channels interspaced with the plurality of openings and configured to be aligned with and receive the plurality of ribs of the body.

14. The gravity-fed beverage brewing assembly of claim 12, wherein a filter material is positioned over each opening of the plurality of openings.

15. The gravity-fed beverage brewing assembly of claim 11, wherein the lid includes a plurality of raised rings positioned to define a plurality of valleys, and further wherein the plurality of through-holes are defined along the plurality of valleys.

16. The gravity-fed beverage brewing assembly of claim 15, wherein the lid includes a raised central surface positioned proximate one of the plurality of raised rings, and further wherein a central through-hole is defined at an apex of the raised central surface.

17. A beverage brewing assembly comprising:
a body defining a cavity, wherein the body includes a plurality of legs, each of the plurality of legs defining a cutout configured to receive a rim edge of a receptacle;
an insert removably positioned within the cavity of the body, wherein the insert defines a plurality of compartments, wherein the body includes a plurality of ribs, each of the plurality of ribs including an upper portion and a lower portion, and further wherein the insert is supported by the lower portion of the plurality of ribs; and
a lid operably coupled with the body and defining a plurality of through-holes, wherein the plurality of through-holes are positioned to facilitate a consistent and evenly distributed flow through each of the plurality of compartments of the insert.

18. The beverage brewing assembly of claim 17, wherein the body is at least partially frustoconical and includes a bottom wall sloped radially downward toward a centerline of the beverage brewing assembly.

19. The beverage brewing assembly of claim 17, wherein the lid includes an upper rim extending upward from an upper surface and configured to define an area for receiving and temporarily retaining liquid poured over the lid, and wherein the lid includes a plurality of raised rings defining a plurality of valleys having the plurality of through-holes.

20. The beverage brewing assembly of claim 17, wherein the insert includes a plurality of interior walls extending from a perimeter wall of the insert, wherein the plurality of interior walls define and separate the plurality of compartments.

\* \* \* \* \*